(12) United States Patent
Roeseler et al.

(10) Patent No.: US 6,317,684 B1
(45) Date of Patent: Nov. 13, 2001

(54) METHOD AND APPARATUS FOR NAVIGATION USING A PORTABLE COMMUNICATION DEVICE

(75) Inventors: Armin Roeseler, Winfield; Yuming Huang, Lisle, both of IL (US)

(73) Assignee: AT&T Wireless Services Inc., Redmond, WA (US)

(*) Notice: Subject to any disclaimer, the term of this patent is extended or adjusted under 35 U.S.C. 154(b) by 0 days.

(21) Appl. No.: 09/469,266

(22) Filed: Dec. 22, 1999

(51) Int. Cl.⁷ .................................................. G06F 165/00
(52) U.S. Cl. ..................... 701/202; 701/210; 701/207; 701/212; 701/208; 340/990; 345/353
(58) Field of Search ................................ 701/202, 209, 701/200, 211; 340/988, 995, 998

(56) References Cited

U.S. PATENT DOCUMENTS

| | | | |
|---|---|---|---|
| 5,835,881 | * 11/1998 | Trovato et al. | 701/211 |
| 5,845,227 | * 12/1998 | Peterson | 701/209 |
| 5,905,451 | * 5/1999 | Sakashita | 340/988 |
| 5,906,654 | * 5/1999 | Sato | 701/201 |
| 5,919,246 | * 7/1999 | Waizmann et al. | 701/209 |
| 6,128,571 | * 10/2000 | Ito et al. | 701/201 |
| 6,151,505 | * 11/2000 | Larkins et al. | 455/456 |

* cited by examiner

Primary Examiner—William A. Cuchinski, Jr.
Assistant Examiner—Tuan C To
(74) Attorney, Agent, or Firm—Oliff & Berridge, PLC (57) ABSTRACT

The invention provides an apparatus and method for route planning and navigation using a portable communication device. A route planning and navigation unit receives a route request from a caller. The route planning and navigation unit checks the latest traffic/road condition data, long term map database, knowledge database, Internet resources, if necessary, and then determines the best route for the driver to reach the destination. The caller may also enter general destination information and be prompted to may a selection from the possible choices. The route planning and navigation unit may also provide exact location information to police officers and emergency personnel, if necessary. During the navigation phase, the caller may receive turn-by-turn navigation and reminders to change lanes in preparation for turns, etc. The route planning and navigation unit may monitor the caller's location, speed, and direction, and provide the caller with updates based on new traffic or road condition changes affecting the caller's route.

22 Claims, 7 Drawing Sheets

METHOD AND APPARATUS FOR NAVIGATION USING A PORTABLE COMMUNICATION DEVICE

BACKGROUND OF THE INVENTION

1. Field of Invention

The present invention is directed to a method and apparatus for route planning and navigation using a portable communication device.

2. Description of Related Art

There are many navigation products on the market today. Some products provide map data via software stored on CDs for display to the driver while others combine the map data with a GPS receiver connected to a separate computer which can determine and display the current location of the vehicle on a map display.

In such a system, the driver inserts the CD with the stored map software into a portable or vehicle mounted computer. The driver inputs a destination and the computer determines the current location using the GPS receiver. The driver can make a route plan based on the map database. Visual and audio output for driving directions may also be provided.

However, in these navigation systems, an extra computer is needed which requires high power consumption. In addition, the driver often must turn off and turn on the computer to resume navigation to conserve batteries. Furthermore, the CDs with the map data stored therein, cannot accommodate for ever changing road conditions, traffic jams, bad weather, etc. Moreover, such a video display is difficult to mount and may cause a safety hazard if the driver averts his or her eyes to view the screen while driving.

SUMMARY OF THE INVENTION

The invention provides an apparatus and method for route planning and navigation using a portable communication device. A route planning and navigation unit receives a route request from a caller. The route planning and navigation unit checks the latest traffic/road condition data, long term map database, knowledge database, Internet resources, if necessary, and then determines the best route for the driver to reach the destination. The best route refers to the route which meets caller's criteria best. For example, the quickest route, the shortest route, the most scenic route, etc. There may be default criteria set by the route planning and navigation unit or by caller. The caller may specify other constraints also, like intermediate stops.

The caller will be informed about the route plan instantly via voice communication. If the destination is invalid, the caller will be prompt to re-enter. The caller may also enter less detailed address. For example, the caller may say "school within 5 miles to the south". In this instance, the route planning and navigation unit may search and present the caller with all the of the schools in the specified area for the caller to select. Other possible examples of a caller's input that may be handled by the route planning and navigation unit may be when the caller says "Sears' Tower in downtown Chicago" or "the best restaurant nearby". If there is no direct route available to the destination, the caller will be informed and options may be provided, such as a re-entry in case of error, or the closest possible point by road, water (if in a boat), etc., if there is no direct path by vehicle or other form of transportation to the destination.

The route planning and navigation unit may also provide assistance for road, police or medical emergencies. Upon the callers DTMF input or audible request, an emergency signal may be sent to the an emergency 911 operator. The route planning and navigation unit may then support the 911 request by providing exact location information of the caller and other route navigation data for police officers, and other emergency personnel.

With respect to the planned route, if the caller desires, the whole route plan may be read for the caller to remember and follow. If the caller is not fully satisfied with the plan, the route planning and navigation unit will generate a new one either automatically, or based on the caller's inputs. If the caller prefers, the route planning and navigation unit will provide turn-by-turn navigation just when the caller is close to the turn. The route planning and navigation unit may remind the caller to change lanes to prepare for the turn. During the caller's planned trip, if the caller desires, the route planning and navigation unit will provide entertainment or information about a nearby area.

The turn-by-turn navigation may be an interactive voice route navigation which works on either continuous mode or intermittent mode. For continuous mode, the caller's communication device may be on a continuous "talk" mode. The "talk" mode may be one-way or two-way, and may be configured so that, if the caller prefers, the caller may make or receive phone calls while still being connected to the route planing and navigation unit.

There may also be an intermittent mode navigation mode. In this mode, the caller's communication device is switched to a "standby" mode when the caller is not talking with the route planning and navigation unit. The route planning and navigation unit may prompt the caller by placing a call to the caller when a navigation instruction is necessary.

For the navigation modes, the route planning and navigation unit will monitor the caller's location, speed, and direction. If it finds that the caller is close to a turn, it may give the turn-by-turn navigation instructions. If new traffic or road condition changes affect the caller's route or if the caller fails to follow the turn-by-turn instruction, it will re-plan a new route and send navigation instructions to the caller when the caller is close to the next turn. If the route is changed by the route planning and navigation unit, an explanation and the reasons for the change may be provided automatically, or at caller's request.

Anytime during the trip, the caller may contact the route planning and navigation unit for navigation assistance. The route planning and navigation unit will retrieve the caller's route from a storage device and provide turn-by-turn navigation upon request.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Figure 1:
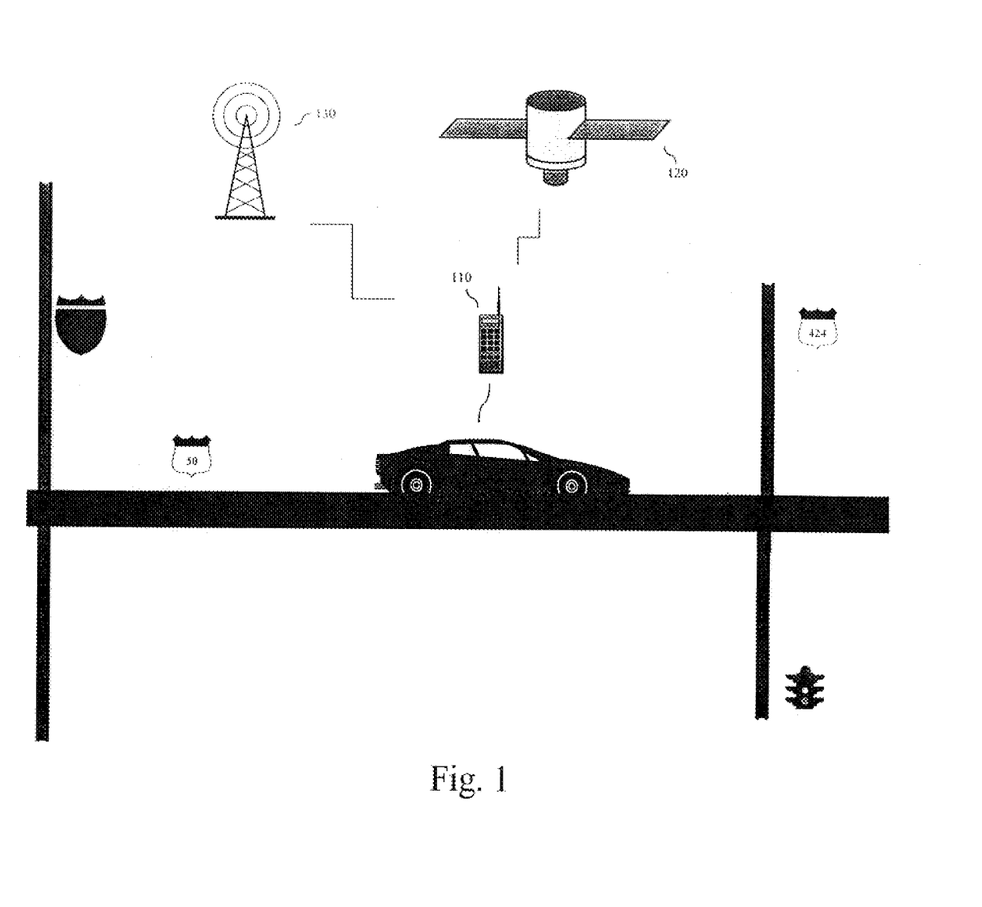
FIG. 1 is an exemplary overall view of one possible embodiment of the invention.

FIG. 1 is an exemplary overview of the route planning and navigation system. The route planning and navigation service provided by the route planning and navigation service would help callers arrive at a destination by providing, for example, turn-by-turn directions to a destination through the use of a portable communication device. In a route planning phase, the route planning and navigation system would receive a destination address from a caller and any possible intermediate points or waypoints (or any other preference, like a road along a river), plan the route based on a dynamic map database, and output the planned route to the caller for approval. If the caller accepts the route, the caller then may then receive directions from the route planning and navigation system while enroute to the destination.

As shown in FIG. 1, one embodiment of the invention uses, for example, the driver's portable communication device 110 to communicate with a cellular phone relay center 130. The communication device 110 has a built-in GPS receiver to determine the caller's location. According to GPS receivers currently available, operation of the GPS receiver requires the use of a plurality of GPS satellites 120 to calculate its location. The route planning and navigation unit upon receipt of this positional information, would then output audible directions to the caller through the portable communication device 110 until the caller reaches the desired destination.

Throughout the caller's route, the route planning and navigation unit may receive updated road condition and traffic information which may be relayed to the caller, whereby the caller may opt to have the route planning and navigation unit provide an alternative route to avoid any traffic problems, weather, etc. The route planning and navigation unit may then re-plan the route based on the new traffic and road condition and the new navigation instructions will be sent to the caller, accordingly. This process may be completely transparent to the caller if performed automatically, so that the caller does not know whether the route is the original route or one that has been newly planned.

Figure 2:
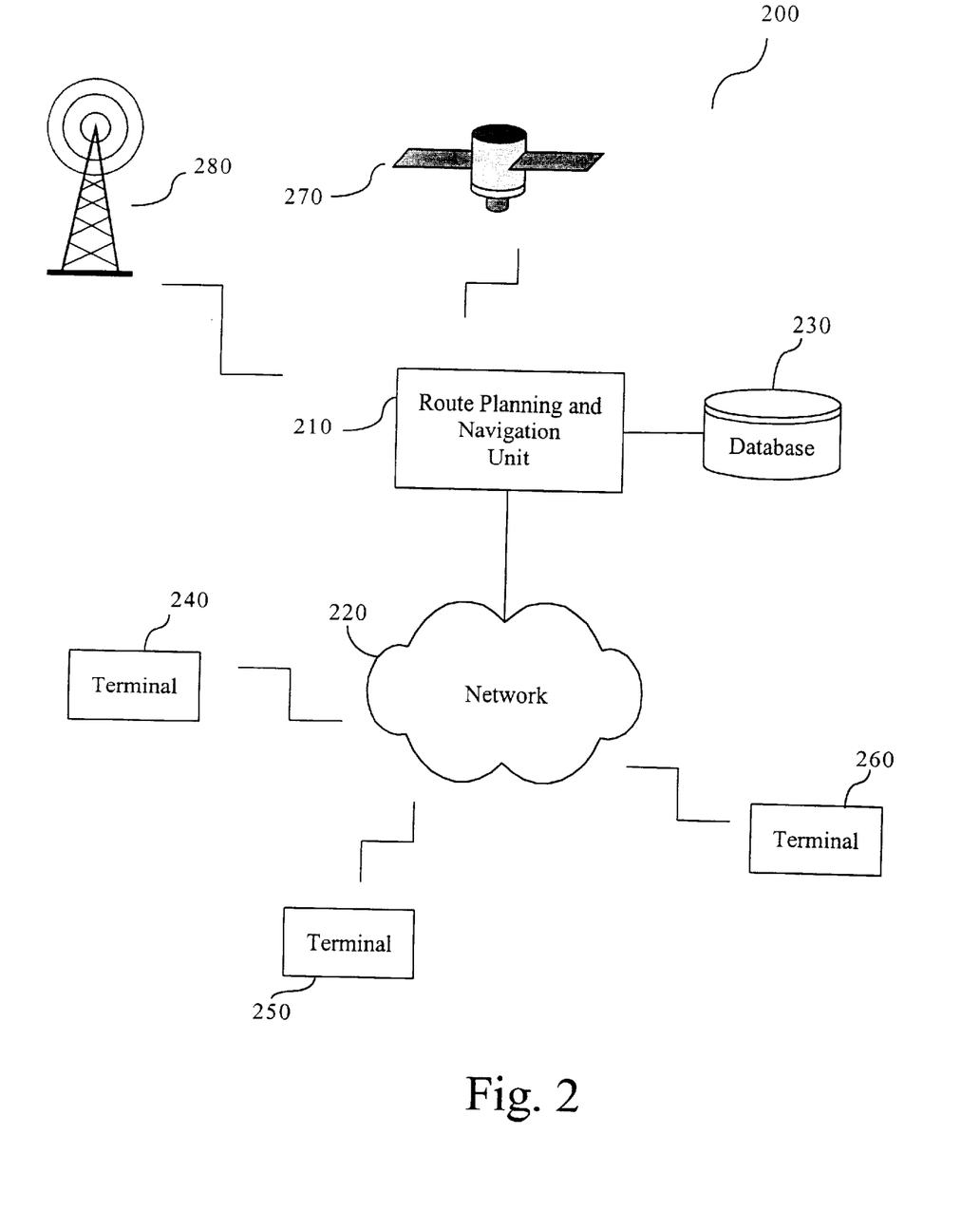
FIG. 2 is an exemplary block diagram of the route planning and navigation system.

FIG. 2 is an exemplary block diagram of a route planning and navigation system 200 according to the present invention. As shown in FIG. 2, the route planning and navigation system 200 includes terminals 240, 250 and 260 coupled to a network 220. The route planning and navigation system 200 further includes a route planning and navigation unit 210 which includes database 230. The route planning and navigation unit 210 receives signals from satellite 270, a cellular phone relay center 280, for example, or other navigation aids or equipment.

The terminals 240, 250 and 260 may be any portable communication device, such as portable digital assistant (PDA), a laptop or a portable computer, a cellular telephone, a pager or any other device that can send and receive communication signals. The terminals 240, 250 and 260 are assigned an identifier which may include, for example, a mobile identification number (MIN), telephone number, device address, user account with time stamp, or any other type of numeric or alphanumeric device identifier appropriate for the device. The identifier may also include fixed or programmable serial numbers or fixed or programmable ID numbers. While the terminals 240, 250 and 260 may be one of the portable communication devices listed above, for purposes of explanation, we will assume that terminals 240, 250 and 260 are cellular telephones which includes a GPS receiver.

Communication signals from the terminals 240, 250 and 260 are received by network 220 and are routed through the network 220, by way of routers and switches (not shown) to the route planning and navigation unit 210. The routing may be performed by switches such as Lucent Technologies, Inc. 5ESS and 4ESS switches, for example, which are generally known in the art.

The network 220 may be a single network or a plurality of networks of the same or different types. For example, the network 220 may be a local telephone network (such as a Bell Atlantic network) in conjunction with a long distance network (such as an AT&T long distance telephone network). Further, the network 220 may be a data network or a telecommunications network in connection with a data network. Any combination of telecommunications and data networks may be used without departing from the spirit and scope of the invention. For purposes of discussion, it will be assumed that the network 220 is a single telecommunications network capable of cellular and satellite communications.

The route planning and navigation unit 210 may be an independent unit coupled to the network 220 (as shown), or it may be distributed throughout the communications network 220. For example, the route planning and navigation unit 210 may be made part of various central offices or servers employed by the network 220 that are distributed throughout the network 220. Any configuration that permits incoming call access from various terminals 240, 250 and 260 on the network 220 to the route planning and navigation unit 210, may be used without departing from the spirit and scope of the present invention.

The route planning and navigation unit 220 is connected to a database 230. The database 230 may be any memory device internal or external to the route planning and navigation unit 210 without departing from the spirit and scope of the present invention. The database 230 may also store other records, such as billing records, subscriber profiles, etc.

The database 230 may also store destinations and routes used by the caller in the past, such as a route to and from a caller's office, etc. In this instance, the caller's route may be permanently stored under the caller's ID number, etc.

Satellite 270 represents any satellite that may provide positioning and/or other information helpful to navigation to a user. The satellite 270 may be part of a Global Positioning System (GPS), a Low Earth Orbit (LEO) satellite, or an Iridium System Satellite, for example. For purposes of discussion, it will be assumed that the satellite 270 is a GPS satellite, so that the GPS phones representing terminals 240, 250 and 260 may be able to receive signals from multiple satellites through a GPS receiver contained within the GPS phone. The GPS receiver is capable of calculating the longitude, latitude and height at an accuracy of 10 meters.

However, any available positioning technique or system, such as a "network triangulation" technique using a cellular relay center 280, for example, may be used to locate the caller within the spirit and scope of the invention.

The location data transmission to the route planning and navigation unit 210 may be automatic and at a given rate (once per second, for example). The positional data may consist of longitude, latitude, height, etc. and consumes a very small portion of the communication channel bandwidth.

The database 230 contains both long-term map data and short-term map data. The long-term map data refers to the common map plus the newly completed roads and communities. There are many ways to update the long-term map data with the various changes, such as through commercial vendors, the Internet, etc.

The short-term map data refers to non-permanent changes, or dynamic traffic and road conditions, etc. For example, the dynamic data may include a traffic jam caused by a traffic accident lasted several hours in a highway portion, a road pavement replacement or construction project that results in a road closure for a matter of days or months, etc.

For purposes of discussion, the portable communication devices which are represented by terminals 240, 250 and 260 are transported within an automobile. However, the invention may be adapted to provide route planning and navigation for other modes of transportation, such as boats, trains, aircraft, etc.

The services provided by the route planning and navigation system 200 may be provided free of charge by a cellular telephone or Internet provider, or, for example, be a subscriber service whereby the callers are billed upon using this service or by a monthly fee, for example. Accordingly, the caller's billing records may be stored in database 230, for example.

Figure 3:
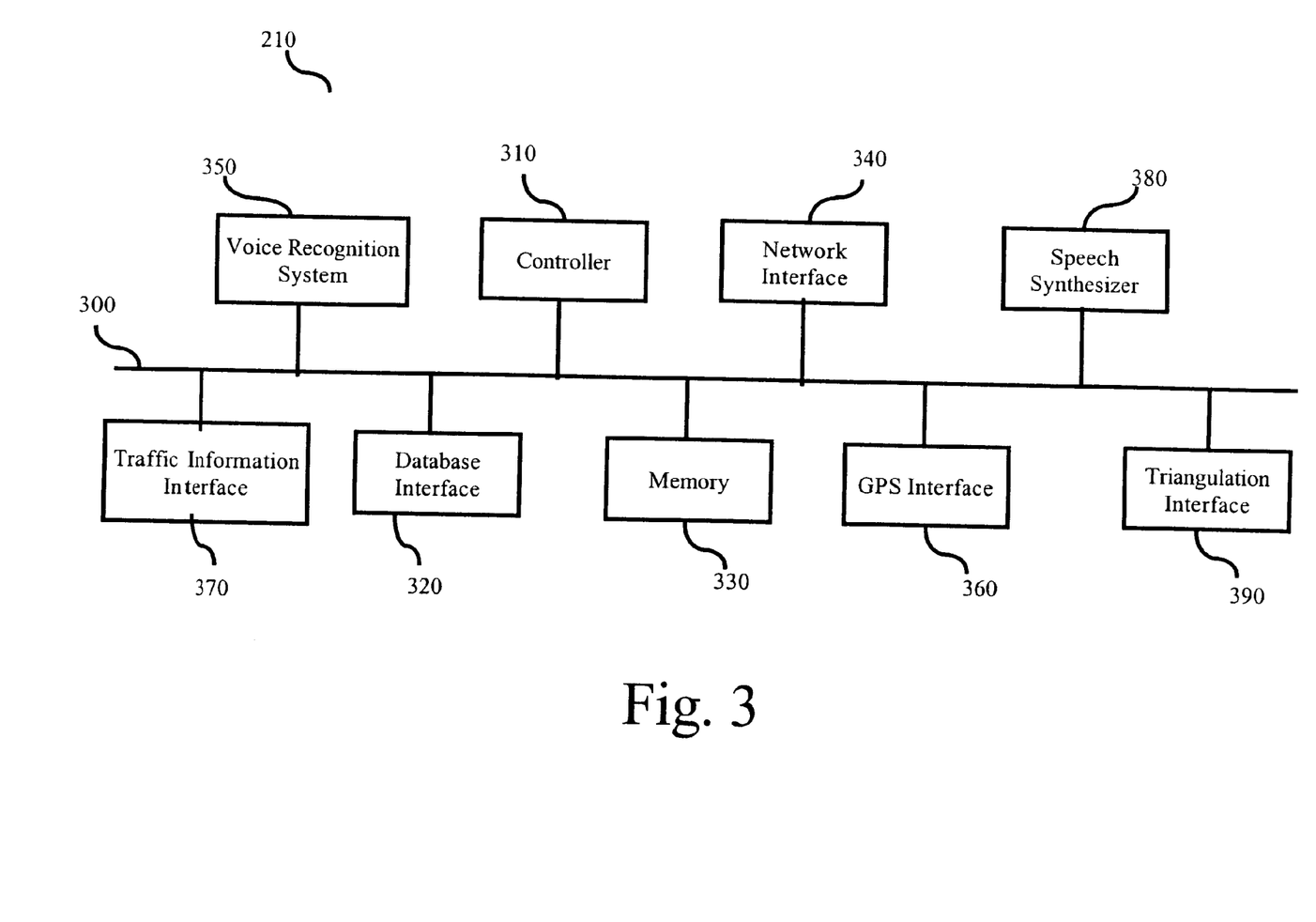
FIG. 3 is an exemplary block diagram of the route planning and navigation unit of FIG. 2.

FIG. 3 is an exemplary block diagram of the route planning and navigation unit 210. The route planning and navigation unit 210 includes a controller 310, a database interface 320, a memory 330, a network interface 340, a voice recognition system 350, a GPS interface 360, a traffic information interface 370, a speech synthesizer 380, and a triangulation interface 390. The above components are coupled together through a control/signal bus 300.

When a call is received by the route planning and navigation unit 210, the controller 310 provides the caller with various options through, for example, either a touch-tone menu or voice recognition via the voice recognition system 350 or a human operator through the network interface 340. The options may include whether the caller would like to plan a route, receive navigation information for an existing route, call for an emergency, etc.

In the route planning phase, the controller 310 receives destination and waypoint inputs from the caller through network interface 340. After receiving all of the inputs, the controller 310 may then contact or retrieve information from a traffic information service, such as the automated traffic information service (ATIS), DOT (Federal and State), police and fire stations, Radio and TV stations, resources on the Internet, etc., through the traffic information interface 370. Such traffic information may include information on traffic congestion, roadwork, detours, iced-over bridges, etc. The controller 310 may automatically alter the route for the caller based on the traffic information received, or may provide the caller with an option to alter the route, for example.

Once the controller 310 has calculated the caller's route, the route is output to the caller by way of audio, printer, computer, etc. via the speech synthesizer 380, or a human operator through network interface 340. The controller 310 then queries the caller as to whether the calculated route is acceptable, or if the caller desires, to alter the route or provide additional instructions. The planned route will be saved in the memory 330, or the database 230 through the database interface 330, according an assigned route ID for later retrieval. If the calculated route is acceptable, the controller 310 relays the route ID number to the caller through network interface 340.

In the navigation phase, the route planning and navigation unit 210 may perform several tasks for the caller, including retrieving and providing directions from a stored route filed under the route ID number, providing directions from a present position to a destination if the driver should become lost, for example, providing a detour around traffic congestion and/or an accident, etc. If the caller requests navigation per a route that has been previously stored in the database 230, the controller 310 receives a call or communication from the caller that previously stored the route via the network interface 340. The controller 310 retrieves the route from the database 230 via the database interface 320 or the memory 330 in accordance with the route ID number which has been provided by the caller. The route ID number may be provided via touch tone or audibly so that it is recognized by the voice recognition system 350, for example. Once the controller 310 retrieves the route, the route is provided to the caller on a, for example, turn-by-turn basis. However, other navigation modes may include, for example, a navigation-by-demand mode where the caller presses a phone key to receive the next turn. The controller 310 will receive traffic information and road condition updates via the traffic information interface 370 and provide the caller with information pertinent to the caller's route via network interface 340. The outputs may be either audible or text, for example.

The caller may be notified regarding information concerning the planned route plan virtually instantaneously via voice communication from the controller 310. If the caller's destination is determined by the controller 310 to be invalid, the controller 310 prompts caller to re-enter the information.

The destination information may also be of a general nature. For example, the caller may also say "school within 5 miles to the south". The controller 310 will search for all schools within 5 miles to the south of the caller's present position. The controller 310 may provide the caller with a list of schools to select via a DTMF menu or audibly, for example. Other examples of general inputs that may be handled by the controller 310 of the route planning and navigation unit 210 may be "Sears' Tower in downtown Chicago" or "the best restaurant nearby".

Furthermore, if there is no direct route available to the destination, the controller 310 will inform the caller and provide the caller with options, such as a re-entry in case of error, or the closest possible point by road, water (if in a boat), etc.(if there is no direct path by vehicle or other form of transportation to the destination).

The controller 310 may also provide assistance for road, police or medical emergencies. Upon the callers DTMF input or audible request, an emergency signal may be sent to the an emergency 911 operator. The controller 310 may then support the 911 request by providing exact location information of the caller and other route navigation data for police officers, and other emergency personnel by positional information passed to the controller 310 through the GPS interface 360 or the triangulation interface 390.

With respect to the planned route, if the caller desires, the controller 310 may recite whole planned route for the caller to remember and follow using the speech synthesizer 380. If the caller is not fully satisfied with the plan, the controller 310 will generate a new route either automatically, or based on the caller's inputs. If the caller prefers, the controller 310 will audibly provide turn-by-turn navigation just when the caller is close to the turn using the speech synthesizer 380. The controller 310 may remind the caller to change lanes to prepare for the turn. During the caller's planned trip, if the caller desires, the controller 310 may provide entertainment or information about a nearby area using the speech synthesizer 380.

The turn-by-turn navigation may be an interactive voice route navigation between the caller and the controller 310 through the network interface 340, which works on either continuous mode or intermittent mode, for example. For continuous mode, the caller's communication device may be on a continuous "talk" mode. The "talk" mode may be one-way or two-way, and may be configured so that, if the caller prefers, the caller may make or receive phone calls while still being connected to the route planing and navigation unit 210.

In the intermittent mode navigation mode, the caller's communication device is switched to a "standby" mode when the caller is not communicating with the controller 310. The controller 310 may prompt the caller by, for example, placing a call to the caller, or sounding an audible tone, etc., when a navigation instruction is necessary or forthcoming.

For the navigation modes, the controller 310 will monitor the caller's location, speed, and direction, through the various interfaces. If the controller 310 discovers that the caller is close to a turn, the controller 310 may give turn-by-turn navigation instructions. If new traffic or road condition changes affect the caller's route or if the caller fails to follow the turn-by-turn instruction, the controller 310 may re-plan a new route and send navigation instructions to the caller via the speech synthesizer 380, when the caller is close to the next turn. If the route is changed by the controller 310, an explanation and the reasons for the change may be provided automatically, or at caller's request.

Anytime during the trip, the caller may contact the route planning and navigation unit 210 for navigation assistance. The controller 310 of route planning and navigation unit 210 will retrieve the caller's route from the memory 330, or database 230, and provide turn-by-turn navigation upon request.

Figure 4:
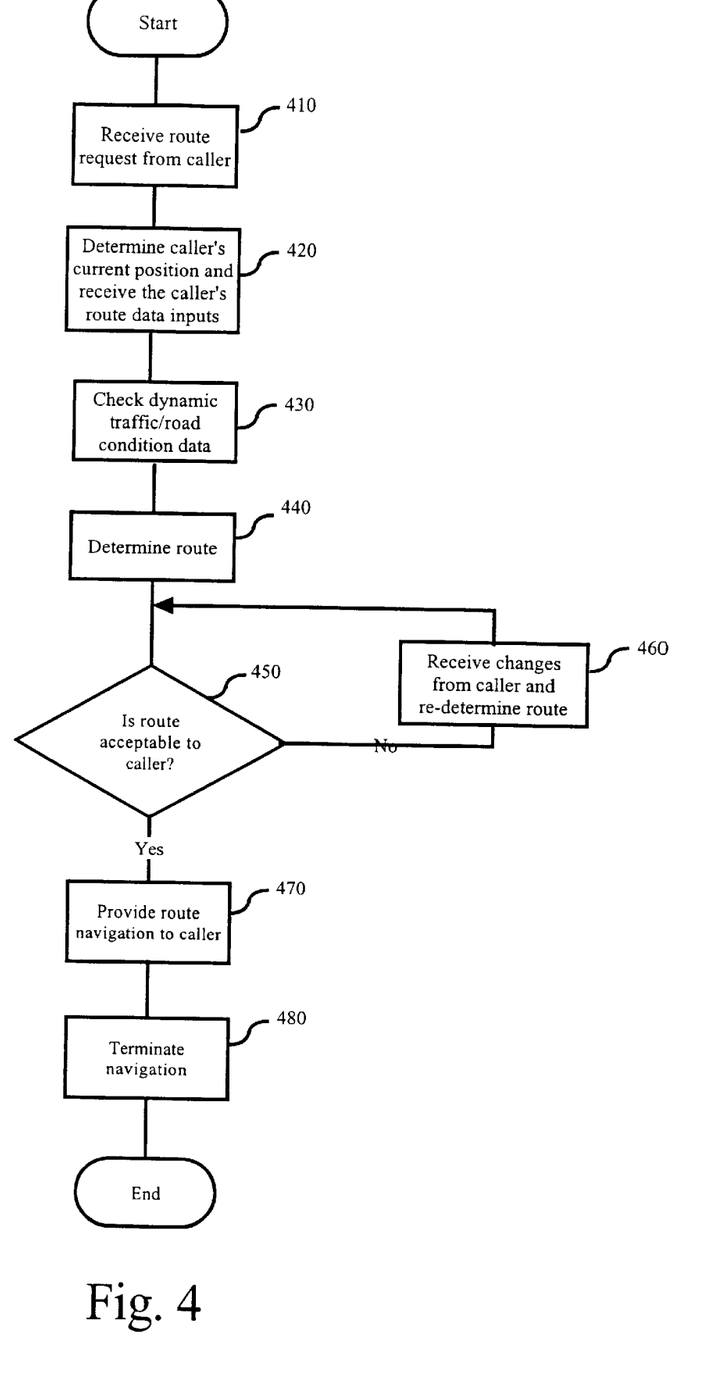
FIG. 4 is an exemplary flowchart of the route planning and navigation phases according to one possible embodiment of the invention.

FIG. 4 is an exemplary flowchart of one possible embodiment of route planning and navigation performed by the route planning and navigation unit 210. At step 410, the controller 310 receives a routing request form a caller using DTMF codes or voice instructions from the portable communication device 110. The caller may dial into the route planning and navigation unit 210 or may press a preprogrammed button on the portable communication device 110, for example. The controller 310 accepts the caller's request and begins to provide service by starting an interactive session. The controller 310 may interpret the caller's input from voice, key stroke, mouse click, etc.

At step 420, as soon as the caller initiates a routing request, the controller 310 determines the caller's current location data which is sent to the controller 310 by the built-in GPS receiver in the caller's portable communication device 110 and prompts the caller to input the destination address and any desired waypoints. The verifies the input destination address with the map databases, for example, and prompts the caller to reenter if not valid.

At step, 430, the controller 310 checks the latest dynamic traffic and road condition data through traffic information interface 370 and determines how the information will affect the caller's route. Then at step 440, the controller 310 determines the caller's route based on the caller's current location, the destination, the caller's input, and the dynamic traffic and road data.

At step 450, the route plan is sent to the caller for approval. If the caller does not accept the route, at step 460, the controller 310 will re-compute the route and prompt the caller for further input, if necessary. The controller 310 will then again, prompt the caller to accept the route.

If the caller accepts the route, at step 470, the controller 310 will guide the caller to the destination by providing turn-by-turn navigation. If the caller does not shut off the communication device completely, the controller 310 will constantly monitor the caller's location, moving speed and direction, as well as the latest traffic and road conditions. If the controller 310 determines that the caller has failed to follow the current planned route, or that the latest traffic and road condition changes affect the caller's planned route, the controller 310 will re-plan the route. Once the caller arrives at the destination, at step 480, the caller will be informed (or the caller will terminate), and the process ends.

Figure 5:
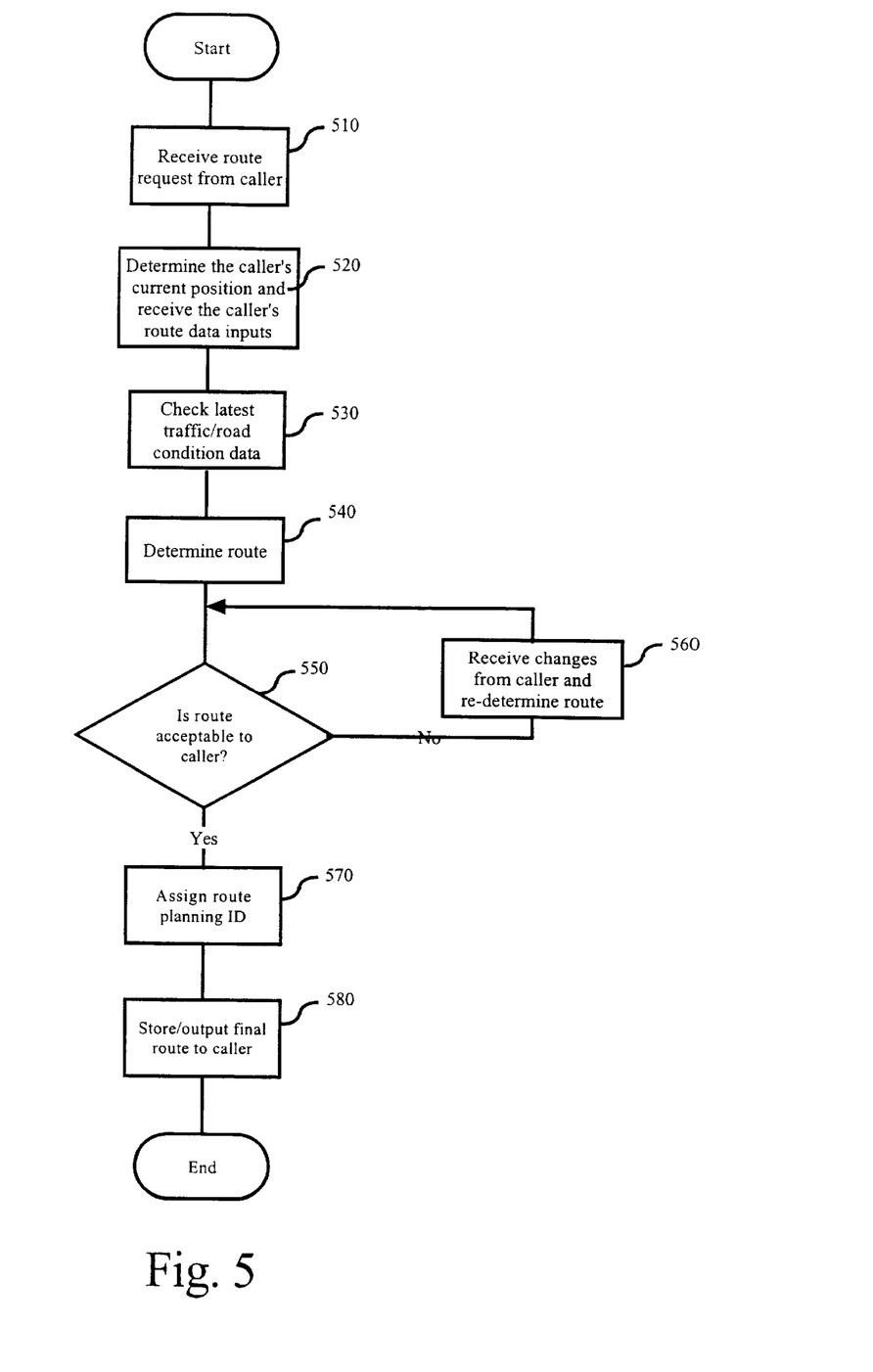
FIG. 5 is an exemplary flowchart of the route planning phase according to another possible embodiment of the invention.

FIG. 5 is an exemplary flowchart of the navigation phase of another possible embodiment of the invention. At step 510, controller 310 receives a route request from the caller. At step 520, the controller 310 determines the caller's current position and prompts the caller for inputs and receives destination and waypoint information from the caller.

At step 530, the controller 310 checks the latest traffic and road condition data through traffic information interface 370 and determines how the information will affect the caller's route. Then at step 540, the controller 310 determines the caller's route. At step 550, the controller 310 queries the caller as to whether the route is acceptable. If the route is not acceptable, the controller 310 prompts the caller for requested changes to the route, at step 560, for example. The process returns to step 550 where the controller 310 again prompts the caller as to whether the route is acceptable. If the route is acceptable to the caller, at step 570, the controller 310 assigns a route planning ID and provided the ID to the caller. At step 580, the controller 310 stores the route in the database 230 through database interface 320 or in memory 330 and output to the caller, if requested, via audio or text, for example, and the process ends.

Figure 6:
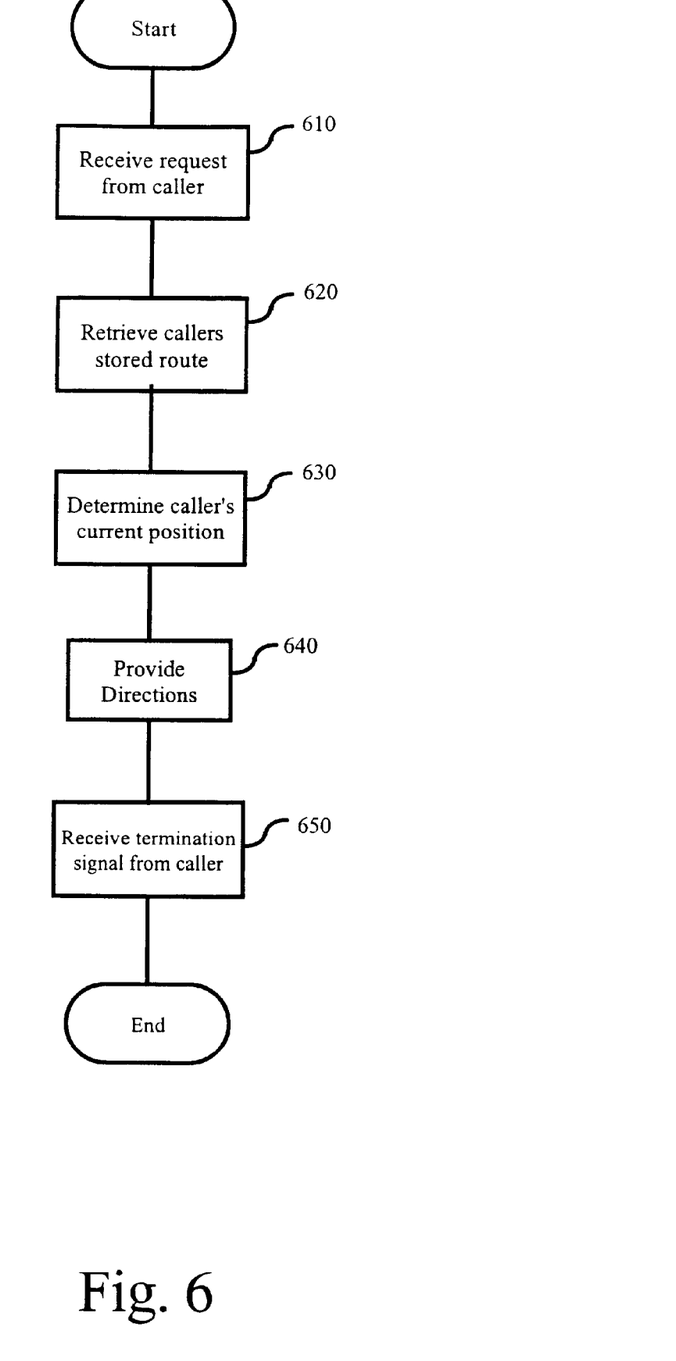
FIG. 6 is an exemplary flowchart of the navigation phase according to another possible embodiment of the invention.

FIG. 6 is an exemplary flowchart of the navigation phase. In step 610, the controller 310 of the route planning and navigation unit 210 receives a request from a caller to retrieve a stored route. The caller may input the route ID and any personal identification numbers, etc. via audio or touch tone (DTMF), for example. At step 620, the controller 310 retrieves the stored route corresponding to the route ID from the database 230 or memory 330. At step 630, the controller 310 determines the caller's current position from, for example, the GPS information received via the GPS receiver in the driver's portable communication device 240, via the GPS interface 360.

At step 640, the controller 310 provides directions from the caller's position on the route via a turn-by-turn basis or on-demand through the portable communication device 240. At step 650, the controller 310 receives a termination signal from the caller. Alternatively, the controller 310 may also terminate the navigation process upon the caller reaching the destination, but may also provide the caller with options, such as an option to plan a new route.

Figure 7:
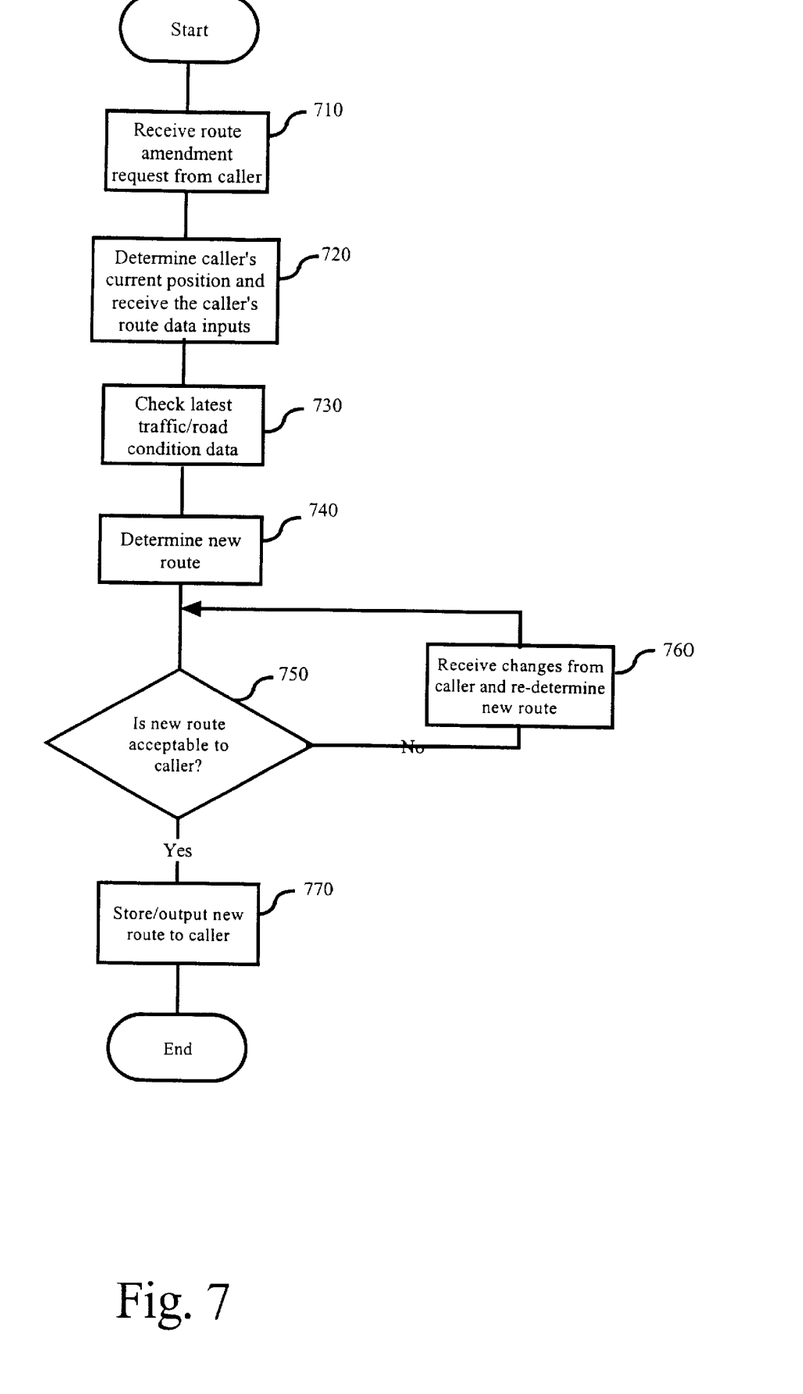
FIG. 7 is an exemplary flowchart of a route modification phase according to another possible embodiment of the invention.

FIG. 7 is a flowchart of a route detour or changing process. At step 710, the controller 310 receives a request from the caller to enter a route amendment. The route amendment may be generated by the controller 310 based on existing traffic information or inputs from the caller, or the route may be manually input by the caller, for example. At step 720, the controller 310 determines the caller's current position from GPS data, for example and receives inputs from the caller concerning the route. At step 730, the controller 310 checks the latest traffic and road condition data through the traffic information interface 370.

At step 740, the controller 310 determines a new route for the caller. At step 750, the controller prompts the caller to accept the route. If the caller does not accept the route, at step 760, the controller 310 receives changes from the caller and determines a new route. The process goes back to step 750 where the controller 310 prompts the caller to accept the route. If the caller accepts the route, the process continues at step 770 where the new route is stored under the same or different route ID number and will be output to the caller through the portable communication device 240 if requested.

While the invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention.

What is claimed is:

1. A method for navigation using a portable communication device in a communication network, comprising:
    receiving a route planning request from a caller;
    receiving the caller's current position from the portable communication device;
    receiving route data inputs including a route destination from the caller;
    checking dynamic traffic and road condition data from a real-time traffic data source;
    determining the caller's planned route based on the received caller's current position, traffic and road condition data and the caller's route data inputs;
    outputting the planned route to the caller through the portable communication device while the caller is enroute to the destination; and
    prompting the caller to confirm if the planned route is acceptable, and if the caller indicates that the planned route is unacceptable, changing the planned route by one of an automatic change or using the caller's inputted change.

2. The method of claim 1, wherein the portable communication device is one of a cellular telephone, a wireless satellite phone, a pager, a portable computer, or a facsimile machine.

3. The method of claim 1, wherein the outputting step outputs the planned route by at least one of an audible output or by a text output.

4. The method of claim 1, further comprising:
    assigning a route ID to the caller's planned route; and
    storing the caller's planned route according to the route ID in a memory.

5. The method of claim 1, wherein the caller's current position is determined by using one of a GPS satellite receiver located in the caller's portable communication device or a network triangulation technique.

6. The method of claim 1, wherein the outputting step provides navigation instructions by one of a turn-by-turn basis or at the caller's request.

7. A method for navigation using a portable communication device in a communication network, comprising:
    receiving a route planning request from a caller;
    receiving the caller's current position from the portable communication device;
    receiving route data inputs including a route destination from the caller, wherein the receiving route data inputs step receives the caller's route data inputs via one of DTMF codes or speech recognition;
    checking dynamic traffic and road condition data from a real-time traffic data source;
    determining the caller's planned route based on the received caller's current position, traffic and road condition data and the caller's route data inputs; and
    outputting the planned route to the caller through the portable communication device while the caller is enroute to the destination.

8. A method for navigation using a portable communication device in a communication network, comprising:
    receiving a route planning request from a caller;
    receiving the caller's current position from the portable communication device;
    receiving route data inputs including a route destination from the caller;
    checking dynamic traffic and road condition data from a real-time traffic data source;
    determining the caller's planned route based on the received caller's current position, traffic and road condition data and the caller's route data inputs;
    outputting the planned route to the caller through the portable communication device while the caller is enroute to the destination;
    prompting the caller to confirm if the planned route is acceptable, and if the caller indicates that the planned route is unacceptable, changing the planned route by one of an automatic change or using the caller's inputted change;
    continuously monitoring traffic and road condition data from the real-time traffic data source; and
    providing the caller with updated traffic information based on information received from the real-time traffic source.

9. The method of claim 8, further comprising:
    changing the caller's planned route based on the updated traffic and road condition data; and
    notifying the caller that the caller's planned route has been changed.

10. A method for navigation using a portable communication device in a communication network, comprising:
    receiving a route planning request from a caller;
    receiving the caller's current position from the portable communication device;
    receiving route data inputs including a route destination from the caller;
    checking dynamic traffic and road condition data from a real-time traffic data source;
    determining the caller's planned route based on the received caller's current position, traffic and road condition data and the caller's route data inputs; and
    outputting the planned route to the caller through the portable communication device while the caller is enroute to the destination, wherein the outputting step provides the caller with a warning prior to a planned turn in the route and the warning includes traffic lane information.

11. A method for navigation using a portable communication device in a communication network, comprising:
   receiving a route planning request from a caller;
   receiving the caller's current position from the portable communication device;
   receiving route data inputs including a route destination from the caller;
   checking dynamic traffic and road condition data from a real-time traffic data source;
   determining the caller's planned route based on the received caller's current position, traffic and road condition data and the caller's route data inputs;
   outputting the planned route to the caller through the portable communication device while the caller is enroute to the destination;
   providing a direct link to 911 emergency system; and
   providing the caller's positional information to emergency personnel in the 911 emergency system upon the caller's request.

12. An apparatus for navigation using a portable communication device in a communication network, comprising:
   a memory for storing map and route date; and
   a controller that receives a route planning request from a caller, receives the caller's current position from the portable communication device, receives route data inputs including a route destination from the caller, checks dynamic traffic and road condition data from a real-time traffic data source, determines the caller's planned route based on the received caller's current position, traffic and road condition data and the caller's route data inputs, and outputs the planned route to the caller through the portable communication device while the caller is enroute to the destination, wherein the controller prompts the caller to confirm if the planned route is acceptable, and if the caller indicates that the planned route is unacceptable, the controller changes the planned route by one of an automatic change or using the caller's inputted change.

13. The apparatus of claim 12, wherein the portable communication device is one of a cellular telephone, a wireless satellite phone, a pager, a portable computer, and a facsimile machine.

14. The apparatus of claim 12, wherein the controller outputs the planned route by at least one of an audible output or by a text output.

15. The apparatus of claim 12, wherein the controller receives the caller's route data inputs via one of DTMF codes or speech recognition.

16. The apparatus of claim 12, wherein the controller assigns a route ID to the caller's planned route, and stores the caller's planned route according to the route ID in the memory.

17. The apparatus of claim 12, wherein the controller changing the caller's planned route based on the updated traffic and road condition data, and notifies the caller that the caller's planned route has been changed.

18. The apparatus of claim 12, wherein the controller determines the caller's current position using one of a GPS satellite receiver located in the caller's portable communication device or a network triangulation technique.

19. The apparatus of claim 12, wherein the controller outputs navigation instructions by one of a turn-by-turn basis or at the caller's request.

20. An apparatus for navigation using a portable communication device in a communication network, comprising:
   a memory for storing map and route date; and
   a controller that receives a route planning request from a caller, receives the caller's current position from the portable communication device, receives route data inputs including a route destination from the caller, checks dynamic traffic and road condition data from a real-time traffic data source, determines the caller's planned route based on the received caller's current position, traffic and road condition data and the caller's route data inputs, and outputs the planned route to the caller through the portable communication device while the caller is enroute to the destination, wherein the controller prompts the caller to confirm if the planned route is acceptable, and if the caller indicates that the planned route is unacceptable, the controller changes the planned route by one of an automatic change or using the caller's inputted change, and wherein the controller continuously monitors traffic and road condition data from the real-time traffic data source, and provides the caller with updated traffic information based on information received from the real-time traffic source.

21. An apparatus for navigation using a portable communication device in a communication network, comprising:
   a memory for storing map and route date; and
   a controller that receives a route planning request from a caller, receives the caller's current position from the portable communication device, receives route data inputs including a route destination from the caller, checks dynamic traffic and road condition data from a real-time traffic data source, determines the caller's planned route based on the received caller's current position, traffic and road condition data and the caller's route data inputs, and outputs the planned route to the caller through the portable communication device while the caller is enroute to the destination, and wherein the controller provides the caller with a warning prior to a planned turn in the route and the warning includes traffic lane information.

22. An apparatus for navigation using a portable communication device in a communication network, comprising:
   a memory for storing map and route date; and
   a controller that receives a route planning request from a caller, receives the caller's current position from the portable communication device, receives route data inputs including a route destination from the caller, checks dynamic traffic and road condition data from a real-time traffic data source, determines the caller's planned route based on the received caller's current position, traffic and road condition data and the caller's route data inputs, and outputs the planned route to the caller through the portable communication device while the caller is enroute to the destination, and wherein the controller provides a direct link to 911 emergency system, and provides the caller's positional information to emergency personnel in the 911 emergency system upon the caller's request.

* * * * *